United States Patent
Gault

(10) Patent No.: US 6,176,306 B1
(45) Date of Patent: Jan. 23, 2001

(54) METHOD AND DEVICE FOR CONTROLLING OPERATION OF HEAT PUMP

(76) Inventor: Robert Gault, P.O. Box 4112, Manassas, VA (US) 20110

(*) Notice: Under 35 U.S.C. 154(b), the term of this patent shall be extended for 0 days.

(21) Appl. No.: 08/886,177

(22) Filed: Jul. 1, 1997

(51) Int. Cl.[7] ..................................... F25B 29/00
(52) U.S. Cl. ................ 165/240; 165/293; 165/242; 165/241; 237/2 B
(58) Field of Search .................... 165/240, 241, 165/242, 293; 237/2 B

(56) References Cited

U.S. PATENT DOCUMENTS

| | | | |
|---|---|---|---|
| 3,167,114 | * 8/1961 | Swart, Jr. ........................ | 165/240 |
| 3,318,372 | * 5/1967 | Shell ............................... | 165/240 |
| 3,563,304 | * 2/1971 | McGrath ......................... | 165/240 |
| 3,768,545 | 10/1973 | Wills . | |
| 3,993,121 | * 11/1976 | Medlin et al. ................... | 165/240 |
| 4,141,408 | * 2/1979 | Garnett ........................... | 165/240 |
| 4,178,988 | * 12/1979 | Cann et al. ...................... | 165/240 |
| 4,228,846 | * 10/1980 | Smorol ............................ | 165/240 |
| 4,265,299 | * 5/1981 | Harnish ........................... | 165/240 |
| 4,311,192 | * 1/1982 | Vander Vaart .................. | 165/240 |
| 4,353,409 | * 10/1982 | Saunders et al. ............... | 165/240 |
| 4,381,814 | 5/1983 | Funk . | |
| 4,387,763 | 6/1983 | Benton . | |
| 4,420,034 | * 12/1983 | Vander Vaart .................. | 165/240 |
| 4,427,055 | * 1/1984 | Heavener ........................ | 165/240 |
| 4,445,567 | * 5/1967 | Nelson ............................ | 165/240 |
| 4,482,008 | * 11/1984 | Nomaguchi et al. ............ | 165/240 |
| 4,574,870 | 3/1986 | Weitman . | |
| 4,703,795 | * 11/1987 | Beckey ........................... | 165/240 |
| 4,716,957 | 1/1988 | Thomspon et al. . | |
| 4,802,529 | * 2/1989 | Sumitani et al. ................ | 165/240 |
| 5,044,425 | * 9/1991 | Tatsumi et al. ................. | 165/240 |
| 5,070,932 | * 12/1991 | Vlasak ............................ | 165/240 |
| 5,131,455 | * 7/1992 | Tsuchiyama et al. ........... | 165/240 |
| 5,174,365 | * 12/1992 | Noguchi et al. ................ | 165/240 |
| 5,332,028 | * 7/1994 | Marvis ............................ | 237/2 B |
| 5,367,601 | 11/1994 | Hannabery . | |
| 5,582,236 | 12/1996 | Eike et al. . | |
| 5,607,014 | * 3/1997 | Van Ostrand et al. .......... | 165/240 |
| 5,967,411 | * 10/1999 | Perry et al. ..................... | 237/2 B |

* cited by examiner

Primary Examiner—Ira S. Lazarus
Assistant Examiner—Terrell McKinnon
(74) Attorney, Agent, or Firm—Bacon & Thomas

(57) ABSTRACT

A method and device for controlling the operation of a heat pump having a primary heat system and an auxiliary heat system, and used to heat air circulating in an enclosure such as a building, the invention comprising a first sensor positioned in the return duct of the heating system for measuring the temperature of air being returned to the heat system from the enclosure, a second sensor for measuring the temperature of air which has been heated only by the primary heat system, a temperature comparing relay for comparing the two sensed temperatures and determining the difference between them and actuating the auxiliary heat system only when the temperature difference is less than a predetermined set point, for example 4° F., thereby providing a significantly enhanced operating efficiency of the heating system.

10 Claims, 3 Drawing Sheets

METHOD AND DEVICE FOR CONTROLLING OPERATION OF HEAT PUMP

This invention relates to a method and device for controlling a heat pump. More particularly this invention relates to a method and device for controlling the operation of an auxiliary heat supply device associated with a heat pump.

BACKGROUND AND OBJECTS

Heat pumps are commonly used for heating and cooling buildings, and particularly residential buildings and homes. These heating systems generally are required to provide heating and cooling over a wide range of operating conditions and load variations. Generally, heat pumps have an auxiliary heat generator for use when the outside temperatures become very low, for example below freezing temperatures. Such auxiliary heaters are often electrical resistance heaters or hot water coils. The heat pump controllers are called upon to operate both the primary heat pump system for heating and cooling and also the backup or auxiliary heaters according to the ambient temperature conditions and load requirements determined by the desired temperature of the environment being heated or cooled.

Several devices are available which have the ability to operate the auxiliary heaters on heat pump systems. Of course simple thermostats have long been available, and several multistage thermostats are also available. Multistage thermostats are intended to operate the primary heat pump system, but when additional heating is required the auxiliary heater is also actuated.

In some cases, an adjustable outdoor thermostat is used to operate the auxiliary heater during cold weather, but adjustment problems on such devices lead to problems. For example, if the device is set too high, the auxiliary heat may engage prematurely causing high energy consumption, and if it is too low, the result would be excessive operating time with little indoor heating provided.

Moreover, differences exist between different heat pumps systems as to when the auxiliary heat is required.

The most common heat pump control is a multistage thermostat, which activates the auxiliary heat with a secondary temperature control in the thermostat itself. This secondary switch is typically set 3° F. colder that the primary switch. Thus, if the indoor temperature is more than 3° F. lower than the desired temperature, the auxiliary heat is engaged. The problem with such systems is that once there is a 3° F. decrease in temperature, the environment becomes uncomfortable and the primary system is forced to run constantly. In addition, the auxiliary heat is not permitted to satisfy the thermostat but is disengaged one or two degrees short of the desired room temperature. Therefore the primary system operates continuously and the auxiliary stage cycles intermittently, resulting in excessive energy consumption. These conditions, in part, give rise to the sensation of "cool heat" common to heat pump systems.

A more recent development in heat pump control devices has been a device which includes two sensors, one in the supply side of the indoor coil and one located outside. The indoor sensor measures air temperature leaving the indoor coil and if it doesn't meet the pre-set temperature requirement for that sensor, the auxiliary heater is turned on. Generally the setting is at about 96° F. The purpose of the outdoor sensor is to make certain that the auxiliary heat is not engaged in the cooling mode. One problem with this system is that the lower the thermostat setting, the greater is the likelihood that air leaving the indoor coil will not reach the 96° F. setting, thus engaging the auxiliary heat more often. Further, the lack of a time delay in such systems means that the auxiliary heat will operate automatically at start-up because it is unlikely that the air will be at 96° F. at the beginning of the cycle.

Such conditions indicate that the auxiliary heat would operate more often and for longer periods of time resulting in higher energy consumption and higher cost.

Another type of control system is disclosed in U.S. Pat. No. 5,367,601 to Hannabery. This system utilizes a sensor in the ductwork downstream of the heating elements and compares the temperature in the ductwork to a setpoint for the ductwork temperature, and controls the duct temperature setpoint in relation to the temperature in the heated space.

Other control devices are shown in U.S. Pat. No. 4,381,814 to Funk, U.S. Pat. No. 4,387,763 to Benton and U.S. Pat. No. 4,716,957 to Thompson et al and U.S. Pat. No. 3,768,545 to Wills.

The primary object of the present invention is to provide a control device for heat pumps which overcomes the disadvantages of prior art control systems.

Another object of the invention is to provide a heat pump control device which enables maximum energy efficient use of the auxiliary heater.

Still another object of the invention is to provide a heat pump control which prevents operation of the auxiliary heater when the heat pump is operating in the cooling or "air conditioning" mode.

These and other objects and advantages of the present invention will become apparent from a detailed consideration of the present application and the accompanying claims, when considered with the accompanying drawings.

SUMMARY OF THE INVENTION

According to the present invention, the heat pump control system or device includes first and second sensors located in the air handling duct. One sensor is positioned in the area of the air return duct, ahead or upstream of the primary and auxiliary heaters, and this sensor is used to determine the temperature of the return air coming from the heated enclosure or room. The second sensor is positioned downstream of the primary heating coil, but still ahead of the auxiliary heater strips. The invention uses a temperature comparing relay which compares the temperature of the intake and discharge air across the primary heating coil, and determines the difference between the two temperatures, i.e. between the temperature of the return air and the temperature of the air heated by the primary heater. If the difference is lower than the set point of the temperature comparing relay, the relay actuates the auxiliary heat until either the thermostat is satisfied or the sensed temperature differential increases to an economical level. If the difference is above the set point, the relay prevents actuation of or turns off the auxiliary heat.

In addition, the temperature comparing relay is provided with a time delay relay which allows the heat pump four minutes of operation to establish a reasonable temperature difference across the coil before the temperature sensors are activated. This prevents actuation of the auxiliary heater prematurely, i.e. before the system has reached stable operation.

By reducing the running time for the heat pump and invoking auxiliary heat only when needed, a more efficient and comfortable operation of the heat pump results.

DESCRIPTION OF THE DRAWINGS

The invention will be described in greater detail with reference to the accompanying drawings which show by way of a non-limiting example, one preferred embodiment. In these drawings.

DETAILED DESCRIPTION OF THE INVENTION

Figure 1:
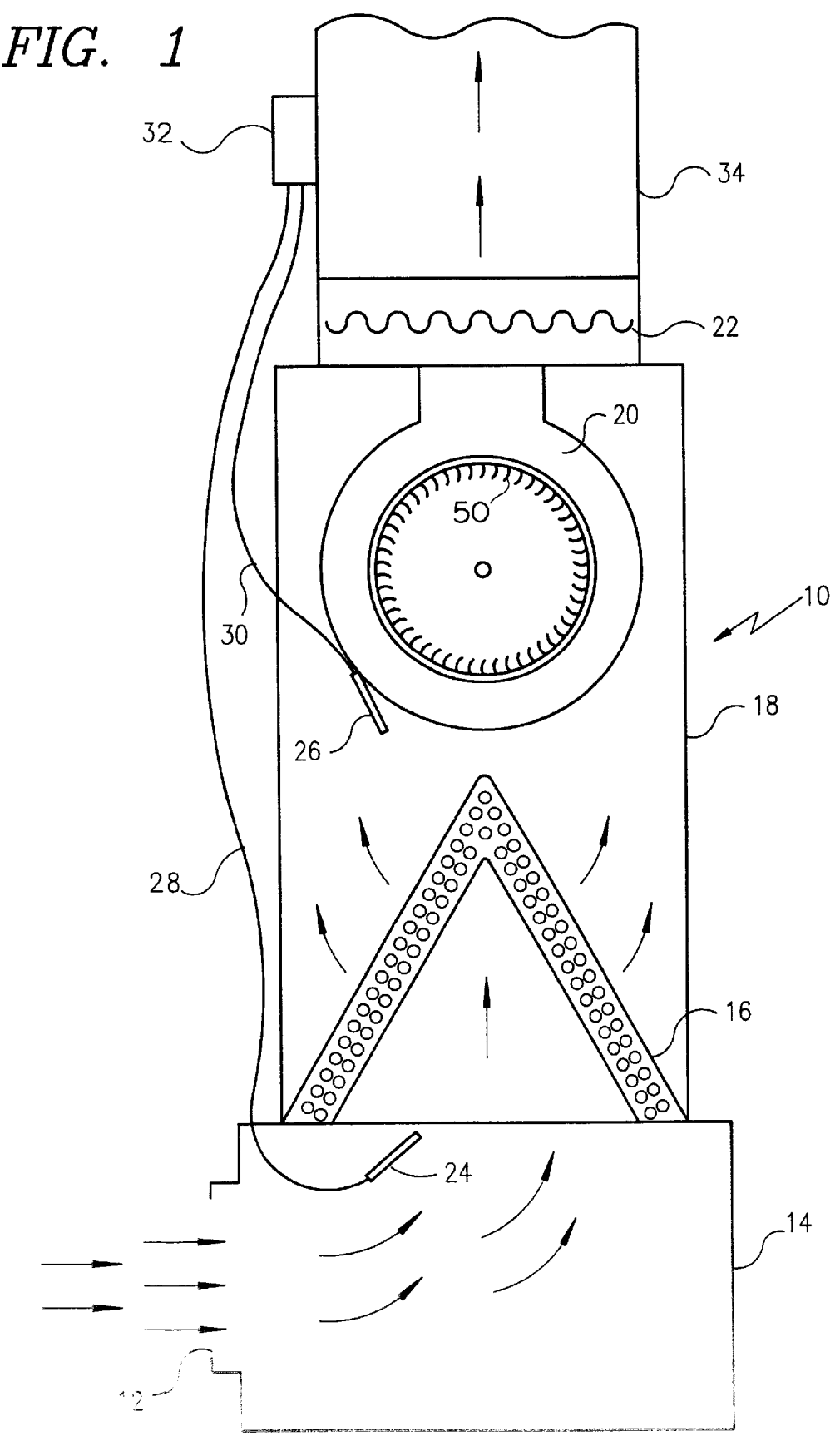
FIG. 1 is a schematic view of a heating system.

Referring to FIG. 1 of the drawings, a conventional heat pump air handler is generally designated 10, and is seen to include a return 12 through which air from the heated room is received into a plenum chamber 14 positioned below a primary heating coil 16. The heating coil 16 is mounted in a chamber 18 and a fan 20 serves to draw the air in through the return 12 and across the coil 16. Directly above the fan 20 is an auxiliary heating unit 22 such as an electrical resistance heater.

A first temperature sensor 24 is mounted in the return chamber 14 ahead of (with respect to the airflow direction) the heating coil 16 for sensing the temperature of the air returning from the heated room. A second temperature sensor 26 is mounted in the chamber 18 after (with respect to the airflow direction) the heating coil for sensing the temperature to which the air has been heated by the primary heating coil 16. The two sensors 24 and 26 are connected by suitable electrical conductors 28, 30, to the control housed in a box 32 which can be suitably mounted, for example, on the discharge chamber 34. The discharge chamber 34 distributes the heated air to the discharge ductwork.

Figure 2:
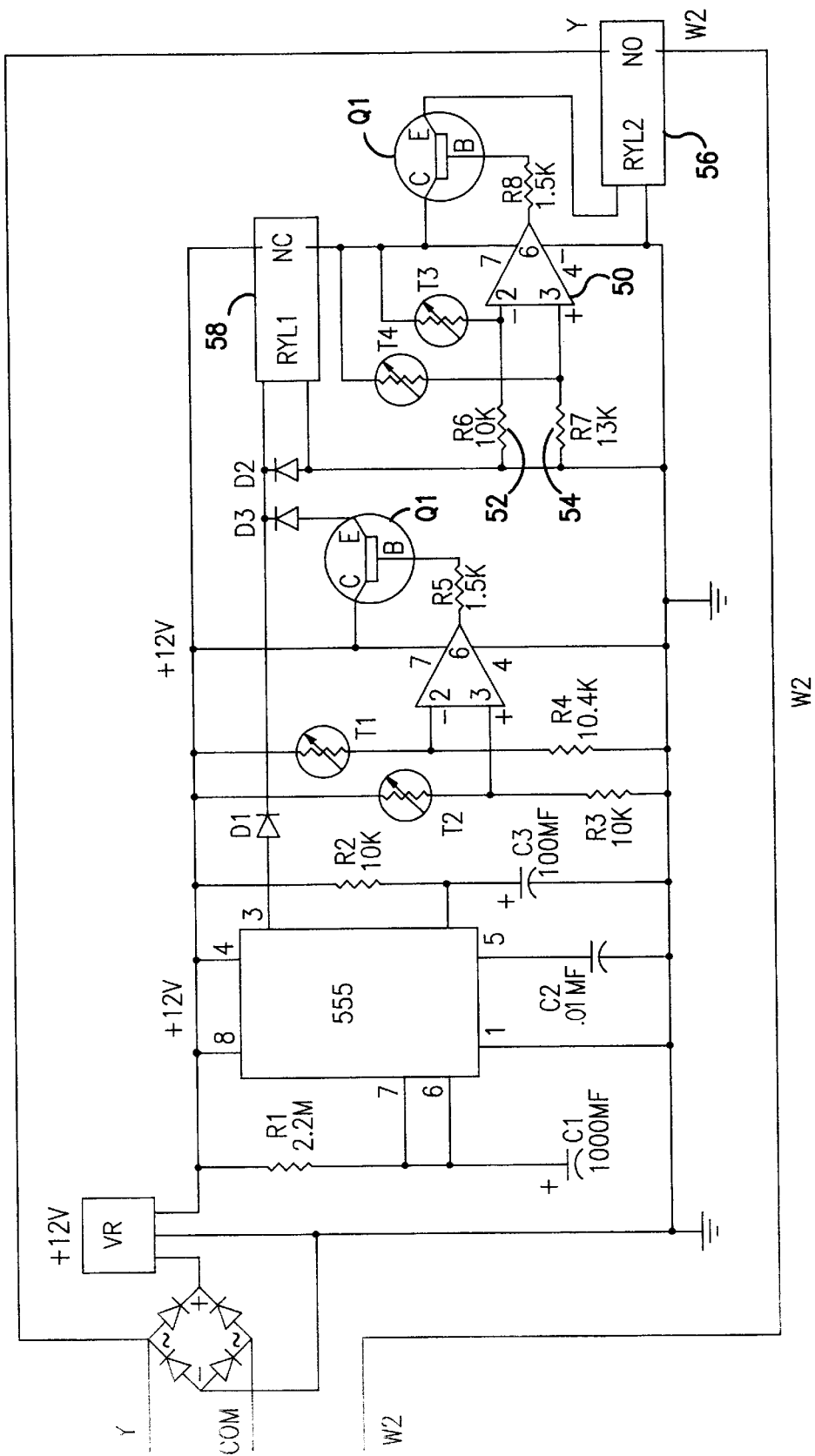
FIG. 2 is a schematic view of the electrical circuit of a heat pump control according to the invention.

A schematic representation of one embodiment of the circuit of the control 32 is shown in FIG. 2. As indicated supra, the control 32 comprises a temperature comparing relay in combination with a time delay relay. The thermistors T1 and T2 (which correspond to the sensors 24 and 26) sense the temperature on both sides of the heating coil 16 and the operational amplifier 50 calculates the difference. That difference is adjustable to establish the set point by means of the variable resistors 52 and 54. Preferably that difference is set to be about 11–13° F. which has been found to be the most efficient setting. By detecting the temperatures of both the input and output air, the heating capability of the heat pump is determined more accurately. The operational amplifier 50 is connected to a transistor Q1 which is used to actuate a relay 56 which turns on the auxiliary heater 22 through the line W2.

The temperature comparing relay thus far described is also controlled by a time delay circuit to impose a delay on the startup of the auxiliary heater in order to provide time for the heating coil to stabilize before the auxiliary heater is turned on. The time delay circuit is based upon the 555 clock chip, the output of which is supplied to a relay 58 in turn connected to the transistor Q1. In this manner, the relay 56 cannot turn on the auxiliary heater until the time delay determined by the clock chip has elapsed, thus providing time for the air temperature passing over the coil 16 to stabilize.

Figure 3:
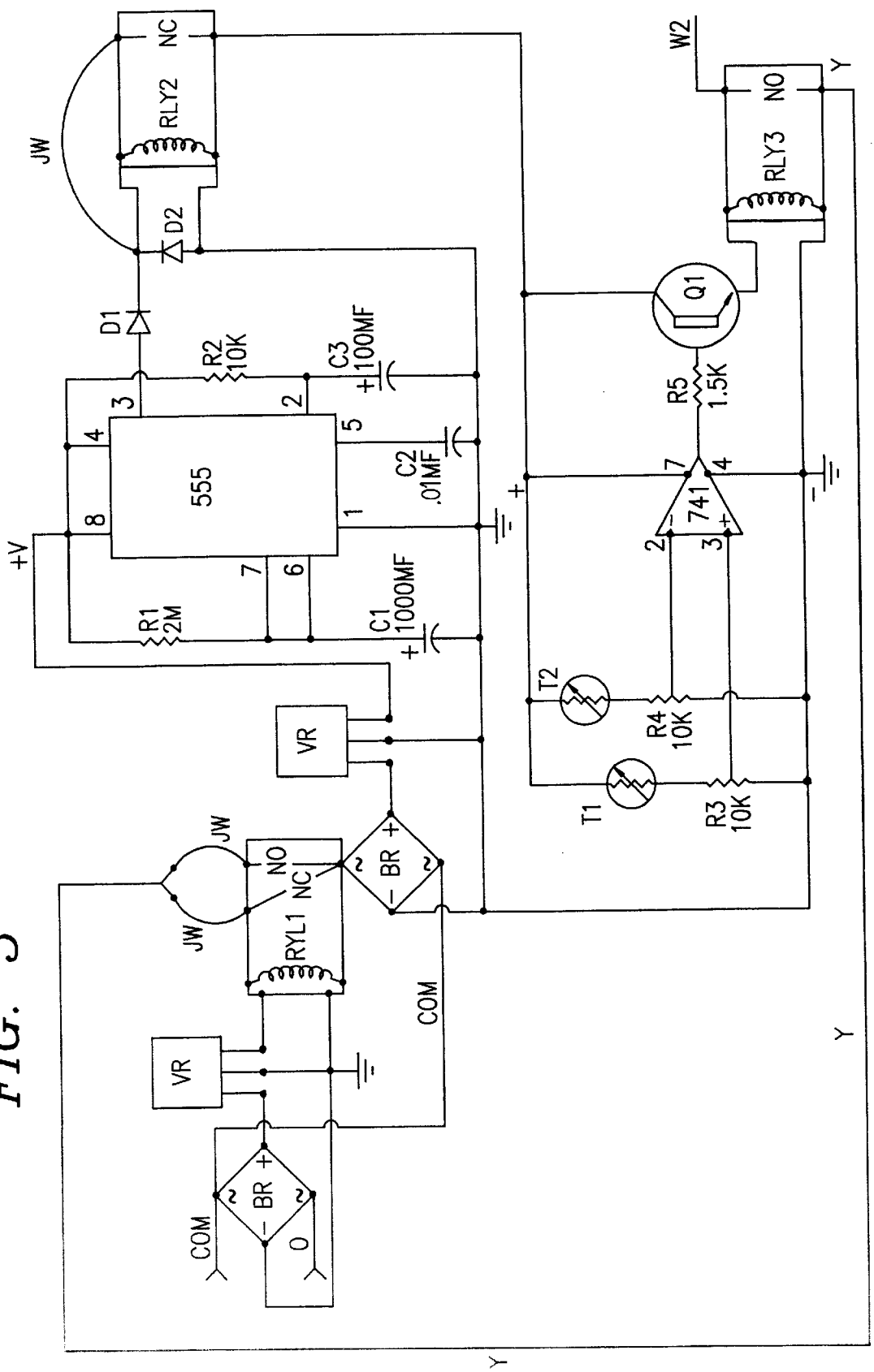
FIG. 3 is a schematic view of the electrical circuit of a heat pump according to an embodiment of the invention.

In another embodiment of the temperature comparing relay shown in FIG. 3, a functionally similar circuit is shown in which the line Y supplies the 24 volt power to the control terminal on relay RLY3 which in turn energizes the heat pump. The input 24 volt power is rectified and passes through either the normally open terminal NO of relay RLY1 or the normally closed terminal NC. From the relay RLY1, current is supplied through line Y to the normally open terminal of relay RLY3, the output W2 of which energizes the auxiliary heater.

The sensor 24 comprises thermistors T2 and T4, while the sensor 26 comprises the thermistors T1 and T3. The operational amplifier 60 receives signals from thermistors T1 and T2 so that when the temperature difference across the coil 16 is less than, for example, 13.5° F., the relay RLY 2 is energized. The relay RLY 2 is the relay which controls the auxiliary heater as triggered by thermistors T3 and T4. When the supply air is 1.5° or more colder than the return air, indicating that the system is in the cooling mode, the relay RLY 1 is energized locking out the relay RLY 2. The relay RLY 1 is the time delay relay and lockout triggered by T1 and T2.

While this invention has been described as having certain preferred features and embodiments, it will be understood that it is capable of still further variation and modification without departing from the spirit of the invention, and this application is intended to cover any and all variations, modifications and adaptations of the invention as may fall within the spirit of the invention and the scope of the appended claims.

I claim:

1. A heat pump control system for controlling the operation of auxiliary heating elements associated with a heat pump primary heating system comprising first and second temperature sensor for measuring the temperature of return air entering into the heating system and air heated only by the primary heating system, means for determining the difference between the temperatures sensed by said first and second temperature sensors, comparing said difference with a predetermined set point, and operating said auxiliary heating elements when said difference is below said predetermined set point.

2. A heat pump control system as in claim 1 and including means for creating a time delay between the commencement of operation of the primary heating system and operation of said auxiliary heating elements.

3. A heat pump control system as in claim 2 and wherein said means for determining the difference between the temperatures sensed by said first and second temperature sensors comprises a temperature comparing relay.

4. A heat pump control system as in claim 3 and wherein said first sensor is positioned ahead of the primary heating system and said second sensor is positioned between the primary heating system and the auxiliary heating elements.

5. A heat pump control system as in claim 4 and wherein said set point is 4° F.

6. A device for controlling a heat pump heating system having primary and auxiliary heating elements for heating air circulating from said heating system, through an enclosure and returning to said heating system, comprising a first sensor positioned for measuring the temperature of air returning to said heating system, a second sensor for measuring the temperature of air heated only by said primary heating element, a relay for comparing the temperatures measured by said sensors and for operating said auxiliary heating elements when the difference between the compared temperatures is below a predetermined set point.

7. A device as in claim 6 and including timer means for operating the primary heating element for a predetermined period of time before operating the auxiliary heating element.

8. A device as in claim 7 and wherein said predetermined set point is 4° F.

9. A method for controlling the operation of a heat pump heating system having primary and auxiliary heating means for heating air circulating from said heating system, through an enclosure and returning to said heating system, said method comprising providing first sensor positioned for measuring the temperature of air returning to said heating system and a second sensor for measuring the temperature of air heated only by said primary heating element, determining the difference between the temperatures measured by said first and second sensors, actuating said auxiliary heating means only when said difference is less than a predetermined set point.

10. A method as in claim 9 and including operating said primary heating means for a predetermined period of time before actuating said auxiliary heating means.

* * * * *